(12) United States Patent
Stevens et al.

(10) Patent No.: US 7,384,621 B2
(45) Date of Patent: Jun. 10, 2008

(54) REFORMING WITH HYDRATION OF CARBON DIOXIDE FIXING MATERIAL

(75) Inventors: James F. Stevens, Katy, TX (US); Julie M. Cao, Houston, TX (US); Thomas M. Vu, Houston, TX (US)

(73) Assignee: Texaco Inc., San Ramon, CA (US)

( * ) Notice: Subject to any disclaimer, the term of this patent is extended or adjusted under 35 U.S.C. 154(b) by 229 days.

(21) Appl. No.: 10/827,189

(22) Filed: Apr. 19, 2004

(65) Prior Publication Data

US 2005/0232856 A1 Oct. 20, 2005

(51) Int. Cl.
*C01B 3/24* (2006.01)
*C01B 3/26* (2006.01)
*C01B 31/20* (2006.01)

(52) U.S. Cl. .................. 423/650; 423/438; 423/651; 423/652

(58) Field of Classification Search ............ 423/652, 423/650, 651, 438
See application file for complete search history.

(56) References Cited

U.S. PATENT DOCUMENTS

| | | | |
|---|---|---|---|
| 3,108,857 A | 10/1963 | Gorin et al. | |
| 3,188,179 A | 6/1965 | Gorin | |
| 3,627,478 A | 12/1971 | Tepper et al. | |
| 5,827,496 A * | 10/1998 | Lyon | 423/659 |
| 6,007,699 A * | 12/1999 | Cole | 208/134 |
| 6,103,143 A | 8/2000 | Sircar et al. | |
| 6,660,680 B1 | 12/2003 | Hampden-Smith et al. | |
| 6,682,838 B2 | 1/2004 | Stevens | |
| 6,685,762 B1 | 2/2004 | Brewster et al. | |
| 6,878,362 B2 * | 4/2005 | Kumar et al. | 423/651 |
| 2002/0085967 A1 * | 7/2002 | Yokota | 422/198 |

(Continued)

FOREIGN PATENT DOCUMENTS

EP 1187668 3/2002

(Continued)

OTHER PUBLICATIONS

Balasubramanian, et al., "Hydrogen from Methane in a Single-Step Process," *Chemical Engineering Science*, vol. 54, No. , pp. 3543-3552 (1999), no month.

(Continued)

*Primary Examiner*—Wayne A. Langel
(74) *Attorney, Agent, or Firm*—Frank C. Turner; Melissa Patangia (57) ABSTRACT

Methods for converting hydrocarbon fuels to hydrogen-rich reformate that incorporate a carbon dioxide fixing mechanism into the initial hydrocarbon conversion process. The mechanism utilizes a carbon dioxide fixing material to remove carbon dioxide from the reformate product stream. The removal of carbon dioxide from the product stream shifts the reforming reaction equilibrium toward higher hydrocarbon conversion with only small amounts of carbon oxides produced. Repeated absorption/desorption of carbon dioxide by the fixing materials tends to decrease the fixing capacity of the materials. Hydration of the carbon dioxide fixing materials between one or more cycles serves to sustain their fixing capacity and to enhance the efficiencies of the reforming and shift reactions occurring in the catalyst bed. Hydration can occur during reactor start-up or shut down, periodically over a number of cycles, and/or upon a monitored change in the reformate composition.

43 Claims, 5 Drawing Sheets

U.S. PATENT DOCUMENTS

2002/0110503 A1   8/2002   Gittleman et al.
2002/0155329 A1*  10/2002  Stevens .................... 429/17
2003/0150163 A1   8/2003   Murata et al.

FOREIGN PATENT DOCUMENTS

JP    2000-273472    10/2000
JP    2002-208425     7/2002

OTHER PUBLICATIONS

Ding et al., Adsorption-enhanced steam-methane reforming, *Chemical Engineering Science*, 55 (2000), Issue 18, pp. 3929-2940, no month.

Xiu et al., New generalized strategy for improving sorption-enhanced reaction process, *Chemical Engineering Science*, 58 (2003), Issue 15, pp. 3425-3437, no month.

Waldron et al., Production of Hydrogen by cyclic sorption enhanced reaction process, *A.I.Ch.E. Journal*, vol. 47, No. 6, pp. 1477-1479 (Jun. 2001).

Alpay et al., "Combined Reaction and Separation in Pressure Swing Processes," *Chemical Engineering Science*, vol. 49, No. 24B, pp. 5845-5864, no date.

Berty et al., "Beat the equilibrium," *Chemtech*, Oct. 1990, pp. 624-629.

Carvill et al., "Sorption-enhanced reaction process," *AIChE Journal*, Oct. 1996, vol. 42, No. 10, pp. 2765-2772.

Han et al., "Simultaneous shift reaction and carbon dioxide separation for the direct production of hydrogen," *Chemical Engineering Science*, vol. 49, No. 24B, pp. 5875-5883 (1995), no date.

Hufton et al., "Sorption-enhanced reaction process for hydrogen production," *AIChE Journal*, Feb. 1999, vol. 45, No. 2, pp. 248-256.

Kuramoto et al., "Repetitive carbonation-calcination reactions of Ca-based sorbents for efficient $CO_2$ sorption at elevated temperatures," *Ind. Eng. Chem. Res.*, 2003, vol. 42, pp. 975-981, no month.

Lin et al., "Hydrogen production from hydrocarbon by integration of water-carbon reaction and carbon dioxide removal (HyPr-RING Method)," *Energy and Fuels*, 2001, vol. 15, pp. 339-343, no month.

Rizeq et al., "Fuel-flexible gasification-combustion technology for production of $H_2$ and sequestration-ready $CO_2$," Annual Technical Progress Report 2002, Oct. 2002, DOE Award No. DE-FC26-00FT40974, General Electric and Environmental Research Corporation.

Silaban et al., "High temperature capture of carbon dioxide: characteristics of the reversible reaction between CaO(s) and $CO_2$(g)," *Chem. Eng. Comm.*, 1995, vol. 137, pp. 177-190, no month.

\* cited by examiner

REFORMING WITH HYDRATION OF CARBON DIOXIDE FIXING MATERIAL

FIELD OF THE INVENTION

The present invention relates to the field of fuel processing wherein hydrocarbon-based fuels are converted into a hydrogen-enriched reformate for ultimate use in hydrogen-consuming devices and processes. The fuel processing methods of the present invention provide a hydrogen-rich reformate of high purity by utilizing absorption enhanced reforming wherein a by-product, such as carbon dioxide, is absorbed from the product stream to shift the conversion reaction equilibrium toward higher hydrocarbon conversion with smaller amounts of by-products produced.

BACKGROUND OF THE INVENTION

Hydrogen is utilized in a wide variety of industries ranging from aerospace to food production to oil and gas production and refining. Hydrogen is used in these industries as a propellant, an atmosphere, a carrier gas, a diluent gas, a fuel component for combustion reactions, a fuel for fuel cells, as well as a reducing agent in numerous chemical reactions and processes. In addition, hydrogen is being considered as an alternative fuel for power generation because it is renewable, abundant, efficient, and unlike other alternatives, produces zero emissions. While there is widespread consumption of hydrogen and great potential for even more, a disadvantage which inhibits further increases in hydrogen consumption is the absence of a hydrogen infrastructure to provide widespread generation, storage and distribution. One way to overcome this difficulty is through distributed generation of hydrogen, such as through the use of fuel reformers to convert a hydrocarbon-based fuel to a hydrogen-rich reformate.

Fuel reforming processes, such as steam reforming, partial oxidation, and autothermal reforming, can be used to convert hydrocarbon fuels such as natural gas, LPG, gasoline, and diesel, into hydrogen-rich reformate at the site where the hydrogen is needed. However, in addition to the desired hydrogen product, fuel reformers typically produce undesirable impurities that reduce the value of the reformate product. For instance, in a conventional steam reforming process, a hydrocarbon feed, such as methane, natural gas, propane, gasoline, naphtha, or diesel, is vaporized, mixed with steam, and passed over a steam reforming catalyst. The majority of the feed hydrocarbon is converted to a mixture of hydrogen and impurities such as carbon monoxide and carbon dioxide. The reformed product gas is typically fed to a water-gas shift bed in which the carbon monoxide is reacted with steam to form carbon dioxide and hydrogen. After the shift step, additional purification steps are required to bring the hydrogen purity to acceptable levels. These steps can include, but are not limited to, methanation, selective oxidation reactions, passing the product stream through membrane separators, and/or pressure swing absorption processes. While such purification technologies may be known, the added cost and complexity of integrating them with a fuel reformer to produce a sufficiently pure hydrogen reformate can render their construction and operation impractical.

In terms of power generation, fuel cells typically employ hydrogen as fuel and oxygen as an oxidizing agent in catalytic oxidation-reduction reactions to produce electricity. As with most industrial applications utilizing hydrogen, the purity of the hydrogen used in fuel cell systems is critical. Specifically, because power generation in fuel cells is proportional to the consumption rate of the reactants both their efficiencies and costs can be improved through the use of a high purity hydrogen reformate. Moreover, the catalysts employed in many types of fuel cells can be deactivated or permanently impaired by exposure to certain impurities. For use in a PEM fuel cell, hydrogen reformate should contain very low levels of carbon monoxide (<50 ppm) so as to prevent carbon monoxide poisoning of the catalysts. In the case of alkaline fuel cells, hydrogen reformate should contain low levels of carbon dioxide so as to prevent the formation of carbonate salts on the electrodes. As a result, an improved yet simplified reforming process capable of providing a high purity hydrogen reformate that is low in carbon oxides is greatly desired.

The disclosure of U.S. Pat. No. 6,682,838, issued to Stevens, Jan. 27, 2004, is incorporated herein by reference.

SUMMARY OF THE INVENTION

In one aspect of the instant invention, a method is provided for generating hydrogen. The method includes the steps of reforming a hydrocarbon fuel in a first catalyst bed at a reforming temperature to produce a reformate comprising hydrogen and at least one impurity selected from the group consisting of carbon monoxide, carbon dioxide, and unreacted hydrocarbon fuel. The first catalyst bed includes a reforming catalyst and a carbon dioxide fixing material that fixes at least a portion of the carbon dioxide to produce a hydrogen-rich reformate and fixed carbon dioxide. The carbon dioxide fixing material within the first catalyst bed is calcinated at a calcination temperature to release fixed carbon dioxide. The amount of hydrogen or the least one impurity in the reformate is monitored and the calcinated carbon dioxide fixing material is hydrated with steam when the monitored amount of hydrogen or the at least one impurity in the reformate is at a predetermined level. In a preferred embodiment where two or more catalyst beds are utilized, the method further includes the step of calcinating a carbon dioxide fixing material within a second catalyst bed while hydrocarbon fuel is reformed in the first catalyst bed.

In another aspect of the instant invention, a method is provided for generating hydrogen. The method includes the steps of performing two or more reforming/calcinating cycles, each reforming/calcinating cycle includes (a) the reforming of a hydrocarbon fuel in a catalyst bed comprising a reforming catalyst and a carbon dioxide fixing material to produce a reformate comprising hydrogen and carbon dioxide, the carbon dioxide fixing material fixing at least a portion of the carbon dioxide to produce a hydrogen-rich reformate and fixed carbon dioxide, and (b) calcinating the carbon dioxide fixing material within the catalyst bed to release fixed carbon dioxide. The method further includes hydrating the calcinated carbon dioxide fixing material with steam after performing the two or more reforming/calcinating cycles. In some embodiments, the method further includes performing one or more reforming/calcinating cycles after hydrating the calcinated carbon dioxide fixing material. In an alternative, the catalyst bed can be allowed to cool to a shut down temperature after hydrating the calcinated carbon dioxide fixing material.

In still another aspect of the instant invention, a method is provided for generating hydrogen. The method includes calcinating a carbon dioxide fixing material within a first catalyst bed at a calcination temperature to release fixed carbon dioxide, hydrating the calcinated carbon dioxide fixing material with steam at hydration temperature below a reforming temperature, and heating the first catalyst bed to the reforming temperature. The first catalyst bed includes a carbon dioxide fixing material suitable for fixing carbon dioxide in a reformate stream and a reforming catalyst. In some embodiments, the method further includes performing one or more reforming/calcinating cycles after heating the catalyst bed to the steam reforming temperature, each reforming/calcinating cycle comprising (a) reforming a hydrocarbon fuel in the first catalyst bed to produce a reformate comprising hydrogen and carbon dioxide, the carbon dioxide fixing material fixing at least a portion of the carbon dioxide to produce a hydrogen-rich reformate and fixed carbon dioxide, and (b) calcinating the carbon dioxide fixing material within the catalyst bed to release fixed carbon dioxide. In a preferred embodiment where two or more catalyst bed are utilized, the method further includes the step of reforming a hydrocarbon fuel in a second catalyst bed while calcinating the carbon dioxide fixing material in the first catalyst bed.

In still yet another aspect of the instant invention, a method is provided for continuously converting hydrocarbon fuel to a hydrogen-rich reformate. The method includes reforming a hydrocarbon fuel in a first catalyst bed at a reforming temperature to produce a hydrogen-rich reformate. The first catalyst bed includes a reforming catalyst and a carbon dioxide fixing material that fixes at least a portion of the carbon dioxide to produce a hydrogen-rich reformate and fixed carbon dioxide. A carbon dioxide fixing material within a second catalyst bed is calcinated by heating the carbon dioxide fixing material to a calcination temperature above the reforming temperature to release fixed carbon dioxide. The second catalyst bed includes a reforming catalyst and carbon dioxide fixing material. The calcinated carbon dioxide fixing material in the second catalyst bed is hydrated with steam at a hydration temperature below the reforming temperature to produce a regenerated carbon dioxide fixing material. Continuous conversion of hydrocarbon fuel to a hydrogen-rich reformate is achieved by reforming the hydrocarbon fuel in the first catalyst bed while hydrating the carbon dioxide fixing material in a second catalyst bed. In an optional but highly preferred embodiment, the method further includes reforming a hydrocarbon fuel in the second catalyst bed at a reforming temperature to produce a hydrogen-rich reformate, the regenerated carbon dioxide fixing material fixing at least a portion of the carbon dioxide to produce a hydrogen-rich reformate and fixed carbon dioxide, and calcinating the carbon dioxide material in the first catalyst bed by heating the carbon dioxide fixing material to a calcination temperature above the reforming temperature. Optionally, the calcinated carbon dioxide fixing material in the first catalyst bed can be hydrated with steam to produce a regenerated carbon dioxide fixing material. Continuous conversion of hydrocarbon fuel to a hydrogen-rich reformate is achieved by reforming hydrocarbon fuel in the second catalyst bed while calcinating the carbon dioxide fixing material in the first catalyst bed.

In still yet another aspect of the instant invention, a method is provided for generating hydrogen. The method includes reforming a hydrocarbon fuel in a catalyst bed comprising a reforming catalyst and a carbon dioxide fixing material at a reforming temperature to produce a reformate comprising hydrogen and carbon dioxide, the carbon dioxide fixing material fixing at least a portion of the carbon dioxide to produce a hydrogen-rich reformate and fixed carbon dioxide. The reformed hydrocarbon fuel is preferably a gas at 30° C., and more preferably includes methane. The carbon dioxide fixing material within the catalyst bed is calcinated at a calcination temperature to release fixed carbon dioxide. The calcinated carbon dioxide fixing material is hydrated with steam at a hydration temperature below the reforming temperature, preferably below 600° C., more preferably below about 450° C. and still more preferably below about 300° C.

BRIEF DESCRIPTION OF THE DRAWINGS

The invention may be understood by reference to the following description taken in conjunction with the accompanying drawings.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE PREFERRED EMBODIMENTS

Illustrative embodiments of the invention are described below. In the interest of clarity, not all features of an actual embodiment are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover it will be appreciated that such a development effort might be complex and time-consuming, but would nevertheless be a routine undertaking for those of ordinary skill in the art having the benefit of this disclosure.

The present invention is generally directed to a method and apparatus for converting hydrocarbon-based fuel to a hydrogen-rich reformate. The present invention simplifies the production of a highly pure hydrogen-rich reformate by incorporating a carbon dioxide fixing mechanism into the initial hydrocarbon conversion process. The mechanism utilizes a carbon dioxide fixing material that can be a substance capable of reacting with carbon dioxide and/or retaining carbon dioxide at a temperature within the range of temperatures that is typical of hydrocarbon conversion to hydrogen and carbon oxides. Hydrocarbon to hydrogen conversion reactions utilizing such carbon dioxide fixing materials are referred to generally as "absorption enhanced reforming" as the absorption or removal of carbon dioxide from the reformate product shifts the reforming reaction equilibrium toward the production of higher concentrations of hydrogen and lower concentrations of carbon oxides.

Carbon dioxide fixing materials can be caused to desorb or evolve carbon dioxide by application of change in temperature, pressure or a combination of changes in temperature and pressure. However, it has been recognized that repeated cycles of fixing/desorption of carbon dioxide tend to decrease the fixing capacity of these materials, thus resulting in reduced hydrocarbon to hydrogen conversion rates. As described herein, it has been found that hydrating these carbon dioxide fixing materials can to an extent regenerate and sustain the fixing capacity of these materials. Moreover, hydration of these materials during reactor start-up or shut down, periodically over a number of cycles, and/or upon a monitored change in the reformate composition can be sufficient to maintain the fixing capacity of the materials over multiple cycles without additional hydration between cycles.

More specifically, the methods of the instant invention concern the generation of a hydrogen-rich reformate from a hydrocarbon fuel using multiple reactions within a common catalyst bed. Typical reactions that may be performed within the catalyst bed include fuel reforming reactions such as steam and/or autothermal reforming reactions that generate a reformate containing hydrogen, carbon oxides and potentially other impurities, water gas shift reactions wherein water and carbon monoxide are converted to hydrogen and carbon dioxide, and carbonation reactions wherein carbon dioxide is physically absorbed or chemically converted to a non-gaseous species such as carbonate. Chemical equations for such a combination of reactions using methane as the hydrocarbon fuel and calcium oxide as the carbon dioxide fixing material are as follows:

| | | |
|---|---|---|
| $CH_4 + H_2O \rightarrow 3H_2 + CO$ | (Steam Reforming) | (I) |
| $H_2O + CO \rightarrow H_2 + CO_2$ | (Water Gas Shift) | (II) |
| $CO_2 + CaO \rightarrow CaCO_3$ | (Carbonation) | (III) |
| $CH_4 + 2H_2O + CaO \rightarrow 4H_2 + CaCO_3$ | (Combined) | (IV) |

While these equations exemplify the conversion of methane to a hydrogen-rich reformate, the scope of the invention should not be so limited.

As used herein the term "hydrocarbon fuel" and includes organic compounds having C—H bonds which are capable of producing hydrogen from a partial oxidation, autothermal and/or a steam reforming reaction. The presence of atoms other than carbon and hydrogen in the molecular structure of the compound is not excluded. Thus, suitable fuels for use in the method and apparatus disclosed herein can include, but are not limited to, hydrocarbon fuels such as natural gas, methane, ethane, propane, butane, naphtha, gasoline, and diesel fuel, and alcohols such as methanol, ethanol, propanol, and the like. Preferably, the hydrocarbon fuel will be a gas at 30° C., standard pressure. More preferably the hydrocarbon fuel will comprise a component selected from the group consisting of methane, ethane, propane, butane, and mixtures of the same.

In addition to a hydrocarbon fuel, a source of water will also be operably connected to the catalyst bed(s). Water can be introduced to the catalyst bed as a liquid or vapor, but is preferably steam. The ratios of the reaction feed components are determined by the desired operating conditions as they affect both operating temperature and hydrogen yield. In embodiments where the reforming reaction utilizes a steam reforming catalyst, the steam to carbon ratio is in the range between about 8:1 to about 1:1, preferably between about 5:1 to about 1.5:1 and more preferably between about 4:1 to about 2:1. However, when the catalyst bed is not being used to perform the reforming reaction, such as when the carbon dioxide fixing material is being heated to a calcination temperature, the flow of steam to the bed will reduced and in some embodiments may be interrupted. In addition, it should also be noted that steam will be used at different temperatures when used for different functions. For example, steam used for hydrating the carbon dioxide fixing material will typically be at a lower temperature than steam used for reforming the hydrocarbon fuel or calcinating the carbon dioxide fixing material.

The reforming catalyst(s) may be in any form including pellets, spheres, extrudates, monoliths, as well as common particulates and agglomerates. Conventional steam reforming catalysts are well known in the art and can include nickel with amounts of cobalt or a noble metal such as platinum, palladium, rhodium, ruthenium, and/or iridium. The catalyst can be supported, for example, on magnesia, alumina, silica, zirconia, or magnesium aluminate, singly or in combination. Alternatively, the steam reforming catalyst can include nickel, preferably supported on magnesia, alumina, silica, zirconia, or magnesium aluminate, singly or in combination, promoted by an alkali metal such as potassium. Where the reforming reaction is preferably a steam reforming reaction, the reforming catalyst preferably comprises rhodium on an alumina support. Suitable reforming catalysts are commercially available from companies such as Cabot Superior Micropowders LLC (Albuquerque, N. Mex.) and Engelhard Corporation (Iselin, N.J.).

Certain reforming catalysts have been found to exhibit activity for both a reforming and water gas shift reaction. In particular, it has been found that a rhodium catalyst on alumina support will catalyze both a steam methane reforming reaction and a water gas shift reaction under the conditions present in the catalyst bed. In such circumstances, the use of a separate water gas shift catalyst is not required. Where the selected reforming catalyst does not catalyze the shift reaction, a separate water gas shift catalyst is an optional but highly preferred component of the catalyst bed.

Reaction temperatures of an autothermal reforming reaction can range from about 550° C. to about 900° C. depending on the feed conditions and the catalyst. In a preferred embodiment, the reforming reaction is a steam reforming reaction with a reforming temperature in the range from about 400° C. to about 800° C., preferably in the range from about 450° C. to about 700° C., and more preferably in the range from about 500° C. to about 650° C. Reaction temperatures can be achieved by flowing gas(es) such as heated streams of helium, nitrogen, steam, as well as heated exhaust gases from a fuel cell or the tail gas of a metal hydride storage system through the catalyst bed. In an alternative, heat exchanging means for removing heat from and/or delivering heat to the catalyst bed can also optionally be incorporated into the catalyst bed, catalyst bed support means or simply imbedded amongst catalyst bed components. Suitable heat exchanging means will be capable of raising the bed temperature to a reforming temperature and/or to a calcination temperature depending on the operational mode of the reactor. Further, heat from the heat exchanging means can also used to pre-heat reactant feeds to the catalyst bed(s).

Suitable heat exchanging means can include means capable of generating heat such as electrically resistant heating coils that are embedded within the catalyst bed. Alternatively, heat exchanging means can comprise heat transfer devices within the catalyst bed that are operably coupled with separate heat generating means. Suitable heat generating means can include conventional heating units such as resistant heating coils, burners or combustors, as well as fuel cell and/or hydrogen storage systems that produce heated exhaust gases. For instance, in a preferred embodiment, the heat exchanging means comprise a heat exchanger coil or heat pipe that is operably coupled to heat generating means capable of providing variable heat so that the amount of heat delivered to the catalyst bed can be adjusted to achieve the appropriate reforming or calcination temperature.

In some embodiments, two or more heat generating means can be used to provide heat within different temperature ranges. More specifically, such embodiments could comprise one heat generating means generates heat for heating the catalyst bed to a reforming reaction temperature and a second heat generating means generates heat for heating a catalyst bed to a calcinating temperature. Where two or more reforming catalyst beds are utilized such that one bed is in reforming mode while simultaneously a second bed is heated to a calcination temperature, it is preferred that the two heat generating means be thermally integrated so as to improve the thermal efficiency of the total system. Thermal integration can be achieved by pre-heating reforming reactant feeds such as hydrocarbon fuel and steam with excess heat generated for heating the second catalyst bed to a calcination temperature. Where the heat generating means comprise a burner or combustor, oxidant(s) to be reacted in the heat generating means can likewise be pre-heated to improve the thermal efficiency of the overall reformer system.

The heating of the catalyst bed for the reforming reaction and/or calcination reaction can be achieved by providing a continuous supply of heat to the bed that is sufficient to achieve and maintain the desired temperature throughout the reaction. In an alternative, the bed may initially be heated to the desired reaction temperature with heating thereafter discontinued as the reaction proceeds. In such an embodiment, the bed temperature is monitored and additional heat provided if needed to maintain a desired reaction temperature.

A water gas shift catalyst can be disposed within the catalyst bed to convert steam and carbon monoxide to hydrogen and carbon dioxide. As note above, providing for a water gas shift reaction within the catalyst bed can be beneficial because carbon monoxide, in addition to being highly toxic to humans, is a poison to many fuel cell catalysts. The maximum level of carbon monoxide in the hydrogen-rich reformate should be a level that can be tolerated by fuel cells, typically below about 50 ppm. In addition, there is growing demand for higher purity reformate streams that have carbon monoxide concentrations below about 25 ppm, preferably below about 15 ppm, more preferably below 10 ppm, and still more preferably below about 5 ppm.

Water gas shift reactions generally occur at temperatures of from about 150° C. to about 600° C. depending on the catalyst used. Low temperature shift catalysts operate at a range of from about 150° C. to about 300° C. and include for example, copper oxide, or copper supported on other transition metal oxides such as zirconia, zinc supported on transition metal oxides or refractory supports such as silica, alumina, zirconia, etc., or a noble metal such as platinum, rhenium, palladium, rhodium or gold on a suitable support such as silica, alumina, zirconia, and the like. Higher temperature shift catalysts are preferably operated at temperatures ranging from about 300° C. to about 600° C. and can include transition metal oxides such as ferric oxide or chromic oxide, and optionally include a promoter such as copper or iron silicide. Suitable high temperature shift catalysts also include supported noble metals such as supported platinum, palladium and/or other platinum group members. Suitable water gas shift catalysts are commercially available from companies such as Cabot Superior Micropowders LLC (Albuquerque, N. Mex.) and Engelhard Corporation (Iselin, N.J.).

The catalyst bed will also include a carbon dioxide fixing material. As used in this disclosure, "carbon dioxide fixing material" is intended to refer to materials and substances that react or bind with carbon dioxide at a temperature within the range of temperatures that is typical of hydrocarbon conversion to hydrogen and carbon oxides. Such carbon dioxide fixing materials include, but are not limited to, those materials that will adsorb or absorb carbon dioxide as well as materials that will convert carbon dioxide to a chemical species that is more easily removed from the reformate gas stream. In addition, suitable fixing materials will need to be stable in the presence of steam at reforming temperatures, can maintain a high carbon dioxide fixing capacity over multiple reforming/calcination cycles, are low in toxicity and pyrophoricity, and will preferably be low in cost.

Suitable carbon dioxide fixing materials can comprise an alkaline earth oxide(s), a doped alkaline earth oxide(s) or mixtures thereof. Preferably, the carbon dioxide fixing material will comprise calcium, strontium, or magnesium salts combined with binding materials such as silicates or clays that prevent the carbon dioxide fixing material from becoming entrained in the gas stream and reduce crystallization that decreases surface area and carbon dioxide absorption. Salts used to make the initial bed can be any salt, such as an oxide or hydroxide that will convert to the carbonate under process conditions. Specific substances that are capable of fixing carbon dioxide in suitable temperature ranges include, but are not limited to, calcium oxide (CaO), calcium hydroxide ($Ca(OH)_2$), strontium oxide (SrO), strontium hydroxide ($Sr(OH)_2$) and mixtures thereof.

Other suitable carbon dioxide fixing materials can include those materials described in U.S. Pat. No. 3,627,478 issued Dec. 14, 1971 to Tepper (describing the use of weak base ion exchange resins at high pressure to absorb $CO_2$); U.S. Pat. No. 6,103,143 issued Aug. 15, 2000 to Sircar et al. (describing a preference for the use of modified double layered hydroxides represented by the formula $[Mg_{(1-x)}Al_x(OH)_2][CO_3]_{x/2yH2}O \cdot zM'_2CO_3$ where $0.09 \leq x \leq 0.40$, $0 \leq y \leq 3.5$, $0 \leq z \leq 3.5$ and M'=Na or K, and spinels and modified spinels represented by the formula $Mg[Al_2]O_4 \cdot yK_2CO_3$ where $0 \leq y \leq 3.5$); U.S. Patent Application Publication No. 2002/0110503 A1 published Aug. 15, 2002 by Gittleman et al. (describing the use of metal and mixed metal oxides of magnesium, calcium, manganese, and lanthanum and the clay minerals such as dolomite and sepiolite); and U.S. Patent Application Publication No. 2003/0150163 A1 published Aug. 14, 2003 by Murata et al. (describing the use of lithium-based compounds such as lithium zirconate, lithium ferrite, lithium silicate, and composites of such lithium compounds with alkaline metal carbonates and/or alkaline earth metal carbonates); the disclosures of each of which are incorporated herein by reference. In addition, mineral compounds such as allanite, andralite, ankerite, anorthite, aragoniter, calcite, dolomite, clinozoisite, huntite, hydrotalcite, lawsonite, meionite, strontianite, vaterite, jutnohorite, minrecordite, benstonite, olekminskite, nyerereite, natrofairchildite, farichildite, zemkorite, butschlite, shrtite, remondite, petersenite, calcioburbankite, burbankite, khanneshite, carboncemaite, brinkite, pryrauite, strontio dressenite, and similar such compounds and mixtures thereof, can be suitable materials for fixing carbon dioxide.

One or more of the described carbon dioxide fixing materials may be preferred depending on such variables as the hydrocarbon fuel to be reformed, the selected reforming reaction conditions and the specification of the hydrogen-rich gas to be produced. In addition, the fixing material selected should exhibit low equilibrium partial pressure of carbon dioxide in the temperature range of about 400° C. to about 650° C. and high equilibrium partial pressure of carbon dioxide at temperatures from about 150° C. to about 400° C. above the selected reforming reaction temperature.

The carbon dioxide fixing material may take any of the forms suggested above for catalysts, including pellets, spheres, extrudates, monoliths, as well as common particulates and agglomerates. In addition, the catalyst(s) and carbon dioxide fixing material may be combined into a mixture in one or more of the forms suggested above. In some embodiments, the carbon dioxide fixing material will be combined with catalyst(s) to form a mixture that is processed into a particulate composite using an aerosol method such as that disclosed in U.S. Pat. No. 6,685,762 issued Feb. 3, 2004 to Brewster, et al., the contents of which are incorporated herein by reference.

Reactor vessels and other process equipment suitable for use in the methods of the instant invention may be fabricated from any material capable of withstanding the operating conditions and chemical environment of the reactions described, and can include, for example, carbon steel, stainless steel, Inconel, Incoloy, Hastelloy, and the like. The operating pressure for the reactor vessel and other process units are preferably from about 0 to about 100 psig, although higher pressures may be employed. Ultimately, the operating pressure of the fuel processor depends upon the delivery pressure required of the hydrogen produced. Where the hydrogen is to be delivered to a fuel cell operating in the 1 to 20 kW range, an operating pressure of 0 to about 100 psig is generally sufficient. Higher pressure conditions may be required depending on the hydrogen requirements of the end user. As described herein, the operating temperatures within the reactor vessel will vary depending on the type reforming reaction, the type of reforming catalyst, the carbon dioxide fixing material, the water gas shift catalyst when used, and selected pressure conditions amongst other variables.

Although conventional catalyst beds having multiple components tend to have a uniform distribution of components along the reactants' pathway through the bed, it has been found that superior conversion rates can be achieved with absorption enhanced reforming where the catalyst(s) and carbon dioxide fixing materials have a non-uniform distribution within the bed. Generally, the catalyst composition nearest the bed inlet should contain an amount of reforming catalyst that is greater than the average level of reforming catalyst across the bed. In contrast, the composition nearest the bed outlet should contain an amount of reforming catalyst that is less than the average level of reforming catalyst across the bed. In a preferred embodiment, the non-uniform distribution will provide no reforming catalyst proximate the bed outlet as there would be little opportunity for carbon dioxide produced by a reforming reaction at such a location to be fixed before the reformate product exits the bed.

In some embodiments, a non-uniform distribution of reforming catalyst can be achieved by providing a generally smooth distribution of reforming catalyst that decreases across the bed from the inlet to the outlet. In other embodiments, a non-uniform distribution of reforming catalyst can be achieved by providing a plurality of reaction zones that have generally decreasing concentrations of reforming catalyst ranging from the inlet to the outlet. A more specific example of a zoned approach is to provide a catalyst bed with a plurality of reaction zones that include an inlet zone located proximate the bed inlet, an outlet zone located proximate the bed outlet, and one or more optional intermediate zones disposed between the inlet and outlet zones. In such embodiments, the inlet zone comprises reforming catalyst, an optional water gas shift catalyst, but preferably no carbon dioxide fixing material. Further, the outlet zone comprises carbon dioxide fixing material and an optional but highly preferred water gas shift catalyst, but no reforming catalyst. A more detailed description of a catalyst beds having a non-uniform distribution of bed components may be found in U.S. patent application entitled "Reactor with Carbon Dioxide Fixing Material," Stevens, et al., filed Apr. 16, 2004 Ser. No. 10/827,600, the contents of which are incorporated herein by reference.

The methods of the present invention produce an improved reformate composition because the carbon dioxide fixing material reversibly reacts with or "fixes" carbon dioxide, thereby removing it from the reformate product and shifting the reforming reaction equilibrium toward the production of increased concentrations of hydrogen. Where the carbon dioxide fixing material is calcium oxide, the fixing reaction is a carbonation reaction that produces calcium carbonate as shown in Equation III above.

Testing has shown that a carbon dioxide fixing material will release fixed carbon dioxide when heated to a higher temperature. As used herein, the term "calcine" and its derivatives are intended to refer to those reactions or processes wherein a carbon dioxide fixing material is heated to a temperature at which fixed carbon dioxide is released due to thermal decomposition, phase transition or some other physical or chemical mechanism. A temperature or range of temperatures at which fixed carbon dioxide is released is referred to as a "calcination temperature". In a preferred embodiment, the calcination temperature for the carbon dioxide fixing material will be above the selected reforming reaction temperature. More specifically, the calcination temperature of the fixing material will be above about 550° C., preferably above about 650° C., and more preferably above about 750° C. Although not to be construed as limiting of suitable carbon dioxide fixing materials, a preferred calcination reaction has the equation:

$$CaCO_3 \rightarrow CO_2 + CaO \qquad \text{(calcination) (V)}.$$

The carbon dioxide fixing material can be heated to a calcination temperature by flowing heated gas(es) through the bed under conditions at which fixed carbon dioxide is released. Such gases can include heated streams of helium, nitrogen, steam and mixtures of the same, as well as heated exhaust gases from a fuel cell or the tail gas of a metal hydride storage system. In addition, heat exchanging and heat generating means such as are described herein can be used to heat the carbon dioxide fixing material to a calcination temperature. In some embodiments, the carbon dioxide fixing material can be heated to a calcination temperature by heated oxidation products that are produced by an oxidation reaction within the reactor. In such an embodiment, hydrocarbon fuel and oxidant are mixed and oxidized either catalytically or non-catalytically within the reactor. In a preferred embodiment, an oxidation zone is disposed within the reactor separate from the catalyst bed so that carbon or other oxidation by-products are not deposited within the catalyst bed. Optionally, a heat transfer device can be used to facilitate the transfer of heat between the catalyst bed and the oxidation zone, particularly when the oxidation zone is disposed downstream of the catalyst bed or external to the reactor vessel. The temperature of the oxidation reaction and the heated oxidation products can be adjusted by adjusting the fuel and oxidant feed streams and/or by directing a temperature moderator into the reactor. Suitable temperature moderators can include a fluid material selected from the group consisting of steam, water, air, carbon dioxide or mixtures of the same. Reactors and methods that utilize heated oxidation products to calcinate a carbon dioxide fixing material are described in greater detail in U.S. Patent Application Publication No. 2002/0085967 A1, published Jul. 4, 2002 by Yokata; U.S. Patent Application Publication No. 2003/0150163 A1, published Aug. 14, 2003 by Murata, et al.; and U.S. patent application entitled "Reactor and Apparatus for Hydrogen Generation", filed Apr. 19, 2004 by Stevens, et al. Ser. No. 10/827,580, the disclosure of each of which is incorporated herein by reference.

Regardless of the means by which the carbon dioxide fixing materials is heated to a calcination temperature, a volume of steam and/or nitrogen can optionally be passed through the bed as a sweep stream for removing released carbon dioxide from the bed.

Figures 3A, 3B:
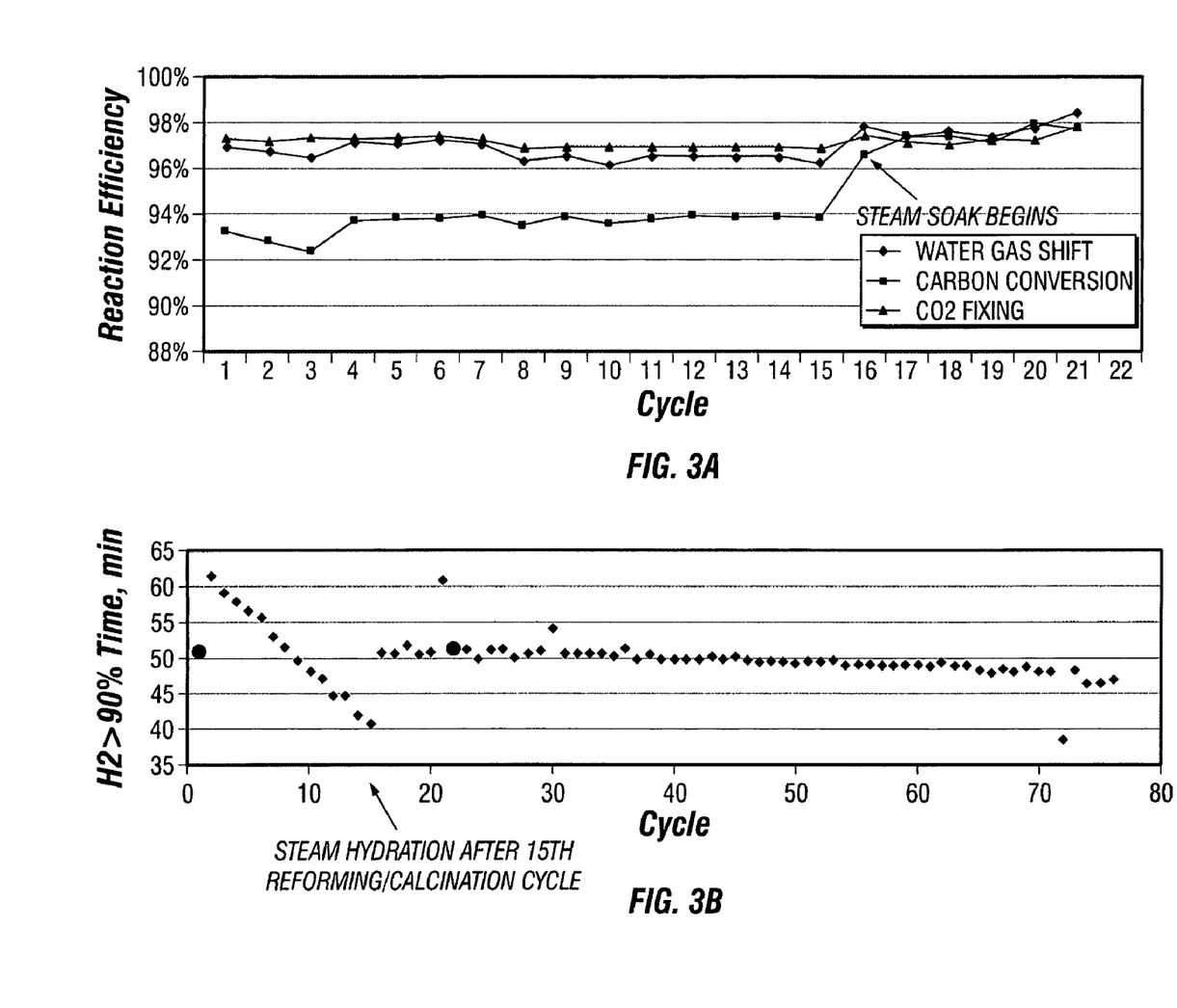
FIG. 3a is a graph illustrating the effect of hydrating a calcinated carbon dioxide fixing material on hydrogen production.
FIG. 3b is a graph illustrating the effect of hydrating a calcinated carbon dioxide fixing material on the efficiencies of reactions occurring within the catalyst bed.

Repeated reforming/calcination cycles tend to decrease the fixing capacity of the carbon dioxide fixing materials and to thereby reduce hydrocarbon to hydrogen conversion rates. In an effort to minimize losses in carbon dioxide fixing capacity, it has been found that hydration of the carbon dioxide fixing material between one or more cycles can sustain the fixing capacity of such materials at acceptable levels. In addition, the hydration of these fixing materials has also been found to provide improvements in reaction efficiencies for both the conversion rate of hydrocarbon fuel to hydrogen and the shift conversion of carbon monoxide to hydrogen and carbon dioxide. Improvements in catalyst bed reaction efficiencies and in carbon dioxide fixing are illustrated in FIG. 3a.

Hydrating a calcinated carbon dioxide fixing material also tends to an extent restore and sustain the fixing capacity of the carbon dioxide fixing material for one or more subsequent reforming/calcination cycles. FIG. 3b represents hydrogen production over multiple reforming/calcination cycles from a catalyst bed that comprising a mixture of rhodium on alumina pellets and calcium oxide. During the reforming portion of the reforming/calcination cycle, steam and methane in a ratio of about 3:1 were directed through the catalyst bed at a reaction temperature of about 600° C. The exit gas was monitored and the length of time that hydrogen was produced at a level of at least about 90% by volume was recorded. When the monitored level of hydrogen in the reformate dropped below 90%, the duration of hydrogen production was recorded and fixed carbon dioxide was removed from the bed by calcination. Calcination was achieved by heating the bed to about 800° C. and flowing steam and nitrogen the bed. After the fifteenth reforming/calcination cycle, the calcinated calcium oxide was hydrated by flowing steam through the bed at 200° C. As is illustrated in FIG. 3b, a sharp rate of decline in hydrogen production occurred over the first fifteen reforming/calcination cycles. However, following hydration of the calcium oxide, hydrogen production times increased and the rate of decrease in hydrogen production over subsequent cycles was significantly reduced. The results illustrated in FIG. 3b indicate that the functional lifetime of the carbon dioxide fixing material can be significantly increased by hydrating the calcinated carbon dioxide fixing material. Furthermore, FIG. 3b also illustrates that such improvements do not require the carbon dioxide fixing material to be hydrated after each calcination.

Hydration can be achieved by contacting calcinated carbon dioxide fixing material with water, preferably in the form of steam. After calcination, the catalyst bed is at an elevated temperature relative to the reforming temperature. Hydration is preferably conducted at a hydration temperature that is below the calcination temperature, and more preferably, below the reforming temperature. Specifically, the hydration temperature should be less than 600° C., preferably below about 500° C., more preferably below about 400° C. and even more preferably below about 300° C. For instance, sufficient hydration can be achieved by passing steam at 200° C. through the catalyst bed. By hydrating the calcinated fixing materials with steam at a lower temperature, the temperature of the catalyst bed is rapidly reduced from the higher calcination temperatures and may be returned to hydrocarbon reforming temperatures more quickly.

Not to be bound by theory, but in embodiments where the carbon dioxide fixing material is calcium oxide, repeated cycles of fixing/calcinating carbon dioxide tends to compact the calcium oxide and form crystalline-like structures. Through hydration, at least a portion of the calcium oxide is converted with steam to calcium hydroxide. The formation of calcium hydroxide within the catalyst bed tends to break up and disrupt the compacted and crystalline-like structures and thereby increase the surface area of calcium oxide available for carbon dioxide fixing in subsequent cycles.

The amount of steam that is needed to achieve sufficient hydration will vary depending on the volume of the catalyst bed, the surface area of the carbon dioxide fixing materials within the bed, the type of fixing material used, the structure or matrix of catalyst(s) and fixing materials within the bed and the flow rate of steam through the bed. Where the fixing material comprises calcium oxide, sufficient steam should be passed through the catalyst bed to convert at least about 10% of the calcium oxide to calcium hydroxide to achieve the desired effect. More specifically, at least about 0.03 kg of steam per kg of calcium oxide is needed to achieve sufficient hydration. Greater quantities of steam may be needed where flow rates are higher.

Hydration of the calcinated carbon dioxide fixing material can occur at virtually any time, including but not limited to, prior to reforming during the reactor start-up procedures, during reactor shut-down before allowing the reactor to cool to a shut-down temperature, and after the performance of a number of reforming/calcination cycles. Regardless of when hydration occurs, the fixing capacity of the materials will be sustained over multiple cycles without the need for additional hydration.

In some embodiments, hydration will be triggered when monitored reformate component levels exceed or fall below predetermined levels. The pre-determined levels of these components are selected as being indicative of when the fixing capacity of the carbon dioxide fixing material has been impaired. The reformate components that can be monitored include, but are not limited to, hydrogen, carbon monoxide, carbon dioxide, and unreacted hydrocarbon fuel. When hydrogen is monitored, the predetermined level of hydrogen that will be indicative of impaired fixing capacity will be a level that is less than about 98% by vol., preferably less than about 96% by vol., and more preferably less than about 94% by vol. When such a concentration of hydrogen is monitored in the reformate composition, hydration of the calcined carbon dioxide fixing materials is triggered so as to regenerate the fixing capacity of the carbon dioxide fixing materials. Similarly, where the volume of an impurity such a carbon dioxide is monitored, the predetermined level is a level that is greater than about 0.5% by vol., preferably greater than about 1% by vol. and more preferably greater than about 1.5% by vol. Where carbon monoxide is monitored, the predetermined level of carbon monoxide that will trigger the hydrating of the fixing material is a level that is greater than about 5 ppm, preferably greater than about 15 ppm, and more preferably greater than about 25 ppm. Where the volume of unreacted hydrocarbon fuel in the reformate is monitored, the predetermined level that will trigger hydration is a level that is greater than about 0.75%, preferably greater than about 1%, and still more preferably greater than about 1.5%. Reformate components can be monitored using conventional means known in the art such as gas sensors and automated sampling using mass spectrometers and the like.

Although not required to sustain the fixing capacity of the carbon dioxide fixing materials, in another embodiment, hydration of calcined fixing materials can occur after each reforming/calcination cycle. In such an embodiment, the hydration temperature is below the reforming temperature used to convert the hydrocarbon fuel to hydrogen, and more specifically, is at a temperature that is less than 600° C., preferably less than 500° C., more preferably less than 400° C., and still more preferably less than 300° C. The hydrocarbon fuel in such an embodiment is a gas at 30° C. and standard pressure, and preferably comprises methane.

In another embodiment, the instant invention provides a method for continuously converting hydrocarbon fuel to a hydrogen-rich reformate utilizing two or more catalyst beds. Such a method comprises the steps of reforming a hydrocarbon fuel in a first catalyst bed comprising a reforming catalyst and carbon dioxide fixing material at a reforming temperature to produce a hydrogen-rich reformate. The carbon dioxide fixing material in the catalyst bed fixes at least a portion of the carbon dioxide. The instant method further includes calcinating a carbon dioxide fixing material in a second catalyst bed that comprises a reforming catalyst and carbon dioxide fixing material by heating the carbon dioxide fixing material to a calcination temperature above the reforming temperature. In addition, the method further comprises hydrating the calcined carbon dioxide fixing material in the second catalyst bed with steam at a hydration temperature that is below the reforming temperature to produce a regenerated carbon dioxide fixing material. Notably, in such methods, the hydrocarbon fuel is reformed in the first catalyst bed while the carbon dioxide fixing material is hydrated in the second catalyst bed such that the conversion of hydrocarbon fuel to hydrogen is continuous.

Optionally, the method can further include reforming a hydrocarbon fuel in the second catalyst bed at a reforming temperature to produce a hydrogen-rich reformate with the regenerated carbon dioxide fixing material in the second bed fixing at least a portion of the carbon dioxide in the hydrogen-rich reformate. The carbon dioxide fixing material in the first catalyst bed is calcinated by heating the carbon dioxide fixing material to a calcination temperature above the reforming temperature while the hydrocarbon fuel is being reformed in the second catalyst bed thereby providing continuous conversion of the hydrocarbon fuel to hydrogen. Optionally, the method can further comprise the step of hydrating the calcined carbon dioxide fixing material in the first catalyst bed with steam to produce a regenerated carbon dioxide fixing material.

Such methods entail the use of two or more catalyst beds so that one or more beds are able to generate hydrogen-rich reformate while the remaining beds are being calcinated. A manifold or a combination of valves is required upstream from the catalyst beds for diverting feed stream(s) such as hydrocarbon fuel and/or steam between the separate catalyst beds. Likewise, a manifold or a combination of valves is required downstream from the catalyst beds for diverting the different effluents from the beds to downstream processing, storage or use.

Optionally, the catalyst beds and/or reactor feeds such as hydrocarbon fuel and steam, are can be pre-heated to a reforming reaction temperature prior to reforming the hydrocarbon fuel. Further, as carbon dioxide fixing materials become at least partially saturated with fixed carbon dioxide, the fixing materials will be heated to a calcination temperature to release the fixed carbon dioxide.

The hydrogen-rich reformate can be optionally be directed to a polishing unit to further polish or purify the hydrogen-rich reformate by removing one or more impurities from the reformate. Examples of such processing units include drying units, methanation reactors, selective oxidizers, pressure swing adsorption systems, membrane separation systems, and combinations of the same. In some embodiments, the polishing unit is a methanation reactor for converting carbon oxides and hydrogen to methane. Because the level of carbon oxides in the hydrogen-rich reformate is particularly low, the amount of hydrogen that is required to convert the carbon oxides to methane is not considered to be significant. Further, methane can remain in the hydrogen-rich reformate stream without creating a deleterious effect on catalyst systems downstream. In other embodiments, the polishing unit comprises a drying unit for removing water from the hydrogen-rich reformate. In a preferred embodiment, the apparatus comprises a methanation reactor with a drying unit disposed downstream of the methanation reactor.

Ultimately, the hydrogen-rich reformate conduit is operably connected to a fuel cell or other hydrogen-consuming device and/or a hydrogen storage device. A detailed description of suitable hydrogen storage devices is provided in U.S. patent application entitled Method And Apparatus For Providing A Continuous Stream Of Reformate" by James F. Stevens, filed Apr. 19, 2004 Ser. No. 10/827,189, the contents of which are incorporated herein by reference.

DETAILED DESCRIPTION OF THE FIGURES

Figure 1:
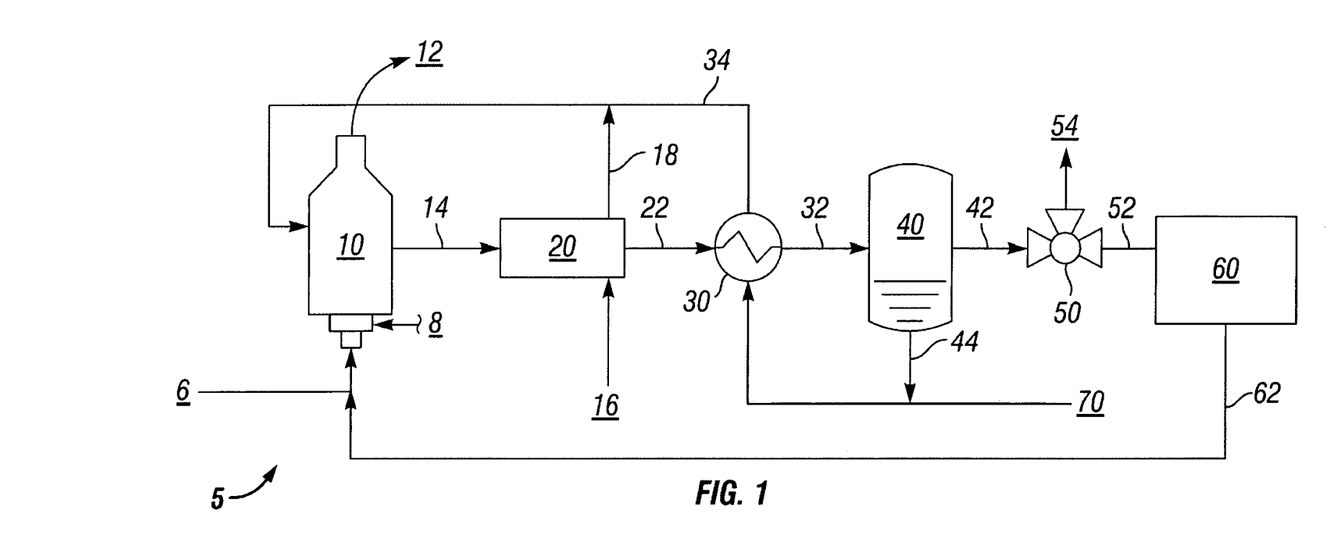
FIG. 1 is a schematic of a generalized apparatus for use in the methods of the present invention, particularly illustrating a combustor for pre-heating the reforming reactants and heating the catalyst bed to a reforming temperature.

As illustrated in FIG. 1, apparatus 5 for performing absorption enhanced reforming comprises burner 10 having inlets for fuel 6, fuel gas 62 and air 8. Burner 10 is capable of producing variable heat such that it can provide the heat required for operating catalyst bed 20 in a reforming mode, as well as the heat required for calcinating the carbon dioxide fixing material in calcination mode. Fuel gas 62 is illustrated as being an exhaust or tail gas from hydrogen storage/consuming device 60 and will typically contain at least a portion of unconsumed hydrogen. Fuel 6, fuel gas 62 and air 8 are combusted in burner 10 to generate heat for the reforming reaction in catalyst bed 20. Burner 10 further has exhaust outlet 12.

Feed water 70 is combined with condensed water 44 and is routed through heat exchanger 30 where it is heated with heat from heated gases 22 exiting the catalyst bed. The composition of the heated gases 22 will depend on the operational state of the apparatus 5, namely, whether the catalyst bed is producing reformate, is being calcinated, or is being hydrated. Heated water/steam 34 exiting heat exchanger 30 is then directed to burner 10 for additional pre-heat. Hydrocarbon fuel 16, the hydrocarbon fuel to be converted in the catalyst bed to hydrogen-rich reformate, is pre-heated in a heat exchanger (not shown) within catalyst bed 20. Pre-heated hydrocarbon fuel 18 is then directed to burner 10 for additional pre-heating. Feed streams of hydrocarbon fuel 18 and steam 34 may be combined prior to pre-heat in burner 10, but are preferably combined intermediate between burner 10 and catalyst bed 20.

When operating in reforming mode, pre-heated steam and hydrocarbon fuel 14 are directed into and through catalyst bed 20 where the hydrocarbon fuel is reformed over the reforming catalyst. The carbon dioxide fixing material within the catalyst bed fixes at least a portion of the carbon dioxide in the reformate. The hydrogen-rich reformate that is produced passes out of the catalyst bed and through heat exchanger 30, reducing the temperature of the reformate. The reformate passes through drying unit 40 where steam is condensed and drops out of the reformate stream 32. Condensed water 44 recovered in drying unit 40 is recycled and combined with feed water 70. The water depleted reformate 42 then passes though manifold 50 before ultimately being passed onto hydrogen storage/consuming device 60.

During calcination mode, burner 10 is used to superheat steam that is used to raise the temperature of the catalyst bed to a calcination temperature. Upon reaching calcination temperature, carbon dioxide fixed within the catalyst bed is released and flows out of the bed. Carbon dioxide-laden gases 22 pass through heat exchanger 30 and are cooled. The cooled carbon dioxide-laden gases 32 pass through drying unit 40 where at least a portion of the steam is condensed out. The carbon dioxide gas 42 then passes to manifold 50 where it is directed to vent 54 or preferably a carbon dioxide sequestering unit (not illustrated).

When operated in hydration mode, a flow of lower temperature steam is directed into the catalyst bed following calcination. This low temperature steam serves to cool catalyst bed 20 and to hydrate the calcinated carbon dioxide fixing material within the bed. Upon completion of hydration, the temperature of burner 10 is again increased to provide heat for reforming.

Figure 2:
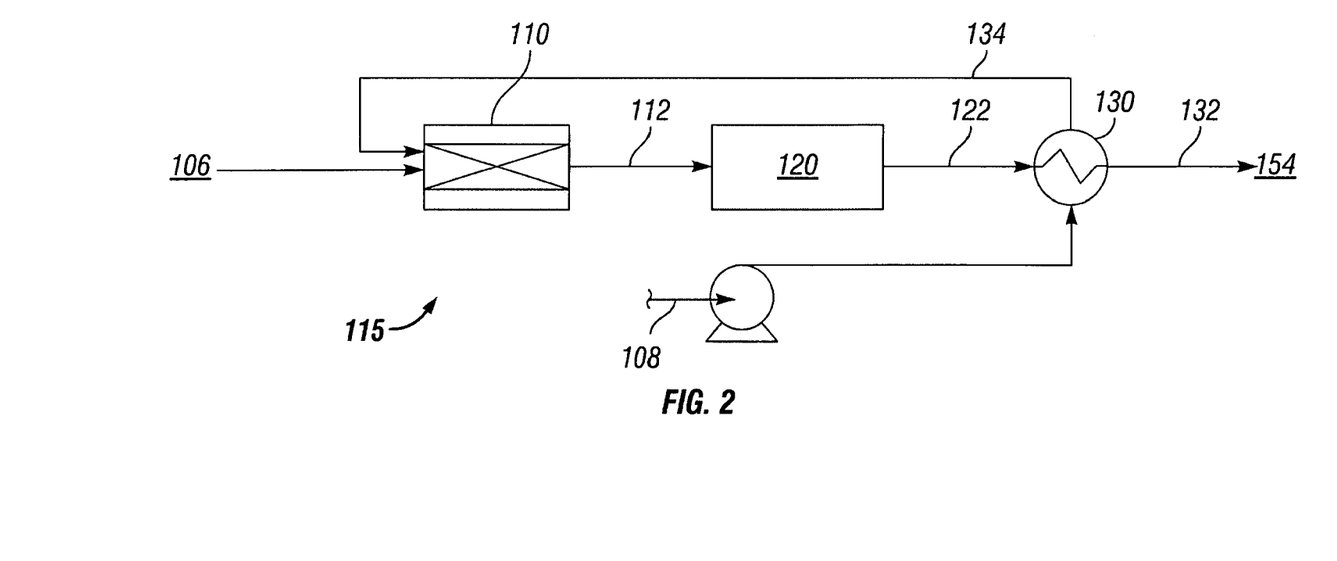
FIG. 2 is a schematic of a generalized apparatus for use in the methods of the present invention, particularly illustrating a catalytic burner for heating the catalyst bed to a calcination temperature.

FIG. 2 is a schematic of reforming apparatus 115 wherein catalytic burner 110 is used to provide the heat for calcinating or regenerating the carbon dioxide fixing material. In this embodiment, a regenerating fuel 106 is supplied to catalytic burner 110. An air source provides regeneration air 108 that is pre-heated in heat exchanger 130. The pre-heated air 134 is then combined with the regeneration fuel 106 and catalytically combusted in burner 110. Superheated exhaust gases 112 from burner 110 are directed into catalyst bed 120 to provide the heat for calcinating the fixing material. Upon reaching the calcination temperature, the carbon dioxide fixing material within the catalyst bed 120 releases fixed carbon dioxide. The carbon dioxide-laden gases 122 pass out of the catalyst bed and through heat exchanger 130 where they are cooled. Ultimately, the carbon dioxide gases 132 are directed to vent or carbon dioxide sequestration unit 154.

Figure 4:
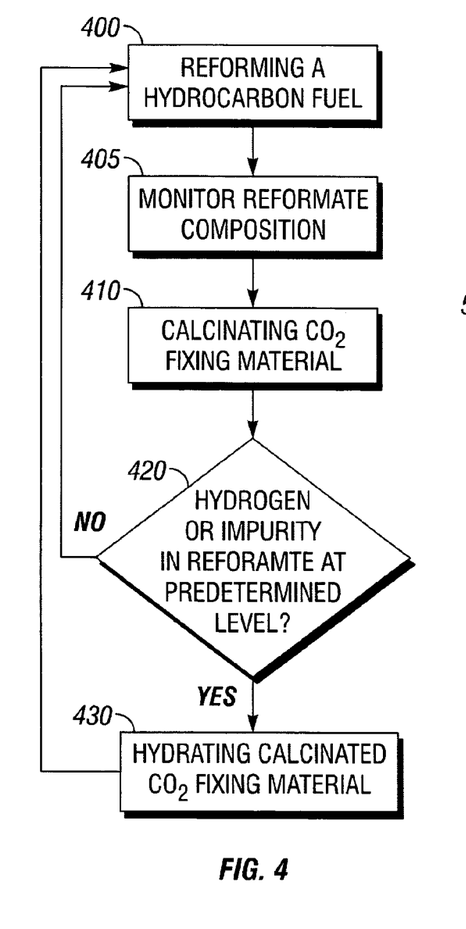
FIG. 4 is a flow diagram illustrating a method of the present invention.

FIG. 4 is a flow diagram illustrating a method for generating hydrogen wherein the hydration of the calcinated carbon dioxide fixing material is triggered by a monitored or detected change in the reformate composition. The method includes the steps of reforming a hydrocarbon fuel (block 400) in a first catalyst bed at a reforming temperature to produce a reformate comprising hydrogen and at least one impurity selected from the group consisting of carbon monoxide, carbon dioxide, and unreacted hydrocarbon fuel. The first catalyst bed includes a reforming catalyst and a carbon dioxide fixing material that converts the hydrocarbon fuel to a reformate while the carbon dioxide fixing materials fixes at least a portion of the carbon dioxide in the reformate to give a hydrogen-rich reformate and fixed carbon dioxide. The carbon dioxide fixing material within the first catalyst bed is calcinated at a calcination temperature to release the fixed carbon dioxide (block 410). Hydrogen and/or at least one impurity in the reformate is quantitatively monitored. This quantity is compared with a predetermined level that is indicative of impairment of the fixing capacity of the carbon dioxide fixing material (block 420). The calcinated carbon dioxide fixing material is hydrated with steam (block 430) when the monitored quantity of hydrogen or the at least one impurity in the reformate reaches the predetermined level for the monitored reformate component.

In an embodiment where hydrogen is monitored, the predetermined level of hydrogen that triggers the hydration of the carbon dioxide fixing material is a level that is less than about 98%, preferably less than about 96% and more preferably less than about 94%. In an embodiment where the impurity that is monitored is carbon dioxide, the predetermined level of carbon dioxide in the reformate that triggers hydration is a carbon dioxide level that is greater than about 0.5%, preferably greater than about 1.0% and more preferable greater than about 1.5%. In an embodiment where the impurity that is monitored is carbon monoxide, the predetermined level of carbon monoxide that triggers hydration of the carbon dioxide fixing material is a level that is greater than about 5 ppm, preferably greater than about 15 ppm, and more preferably greater than about 25 ppm. In an embodiment where the impurity that is monitored is unreacted hydrocarbon fuel, the predetermined level of unreacted fuel in the reformate that triggers hydration of the carbon dioxide fixing material is a level that is greater than about 0.75%, preferably greater than about 1.0% and more preferable greater than about 1.5%. In a preferred embodiment, where two or more catalyst bed are utilized, such as is illustrated in FIG. 7, the method further includes the step of calcinating a carbon dioxide fixing material within a second catalyst bed while hydrocarbon fuel is being reformed in the first catalyst bed.

Figure 5:
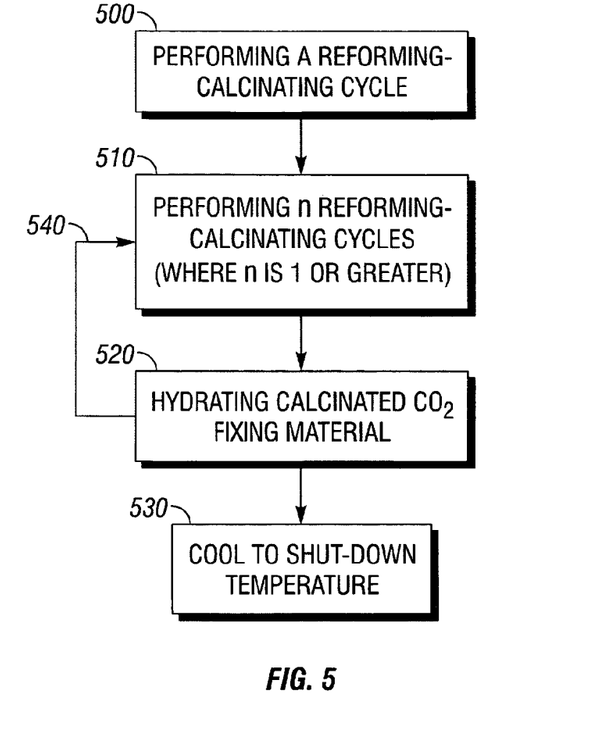
FIG. 5 is a flow diagram illustrating a method of the present invention.

FIG. 5 illustrates yet another embodiment of the instant invention, namely, a method for generating hydrogen wherein the calcincated carbon dioxide fixing material is hydrated after two or more reforming/calcinating cycles. The method includes the steps of performing or more reforming/calcinating cycles (blocks 500 and 510), each reforming/calcinating cycle including (a) the reforming of a hydrocarbon fuel in a catalyst bed comprising a reforming catalyst and a carbon dioxide fixing material to produce a reformate comprising hydrogen and carbon dioxide, the carbon dioxide fixing material fixing at least a portion of the carbon dioxide in the reformate, and (b) calcinating the carbon dioxide fixing material within the catalyst bed to release fixed carbon dioxide. The method further includes hydrating the calcinated carbon dioxide fixing material with steam (block 520) after performing the two or more reforming/calcinating cycles. Optionally, the method further includes performing one or more reforming/calcinating cycles (block 540) after hydrating the calcinated carbon dioxide fixing material. In the alternative, the catalyst bed can be allowed to cool to a shut down temperature (block 530) after hydrating the calcinated carbon dioxide fixing material.

Figure 6:
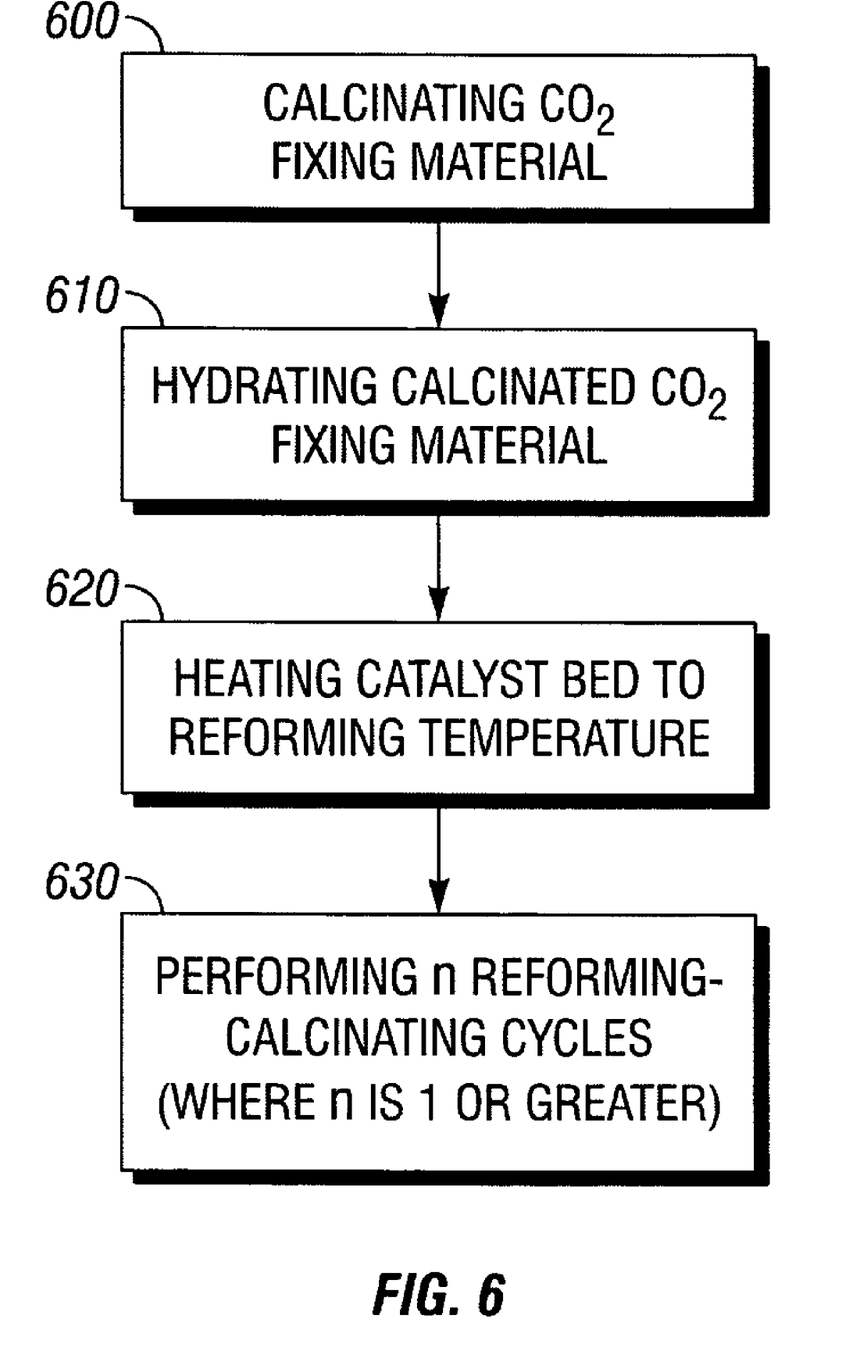
FIG. 6 is a flow diagram illustrating a method of the present invention.

In still another embodiment of the instant invention, generally illustrated in FIG. 6, a method is provided for generating hydrogen wherein a calcinated carbon dioxide fixing material is hydrated upon start-up of a reactor. The method includes calcinating a carbon dioxide fixing material within a first catalyst bed at a calcination temperature to release fixed carbon dioxide (block 600), hydrating the calcinated carbon dioxide fixing material (block 610) with steam at a hydration temperature below a reforming temperature, and heating the first catalyst bed to the reforming temperature (block 620). The first catalyst bed includes a carbon dioxide fixing material suitable for fixing carbon dioxide in a reformate stream and a reforming catalyst. In an optional, but highly preferred embodiment, the method further includes performing one or more reforming/calcinating cycles (block 630) after heating the catalyst bed to the steam reforming temperature, each reforming/calcinating cycle comprising (a) reforming a hydrocarbon fuel in the first catalyst bed to produce a reformate comprising hydrogen and carbon dioxide, the carbon dioxide fixing material fixing at least a portion of the carbon dioxide in the reformate and (b) calcinating the carbon dioxide fixing material within the catalyst bed to release fixed carbon dioxide. In an embodiment where two or more catalyst bed are utilized, the method further includes the step of reforming a hydrocarbon fuel in a second catalyst bed while calcinating the carbon dioxide fixing material in the first catalyst bed, as is generally illustrated in FIG. 7.

Figure 7:
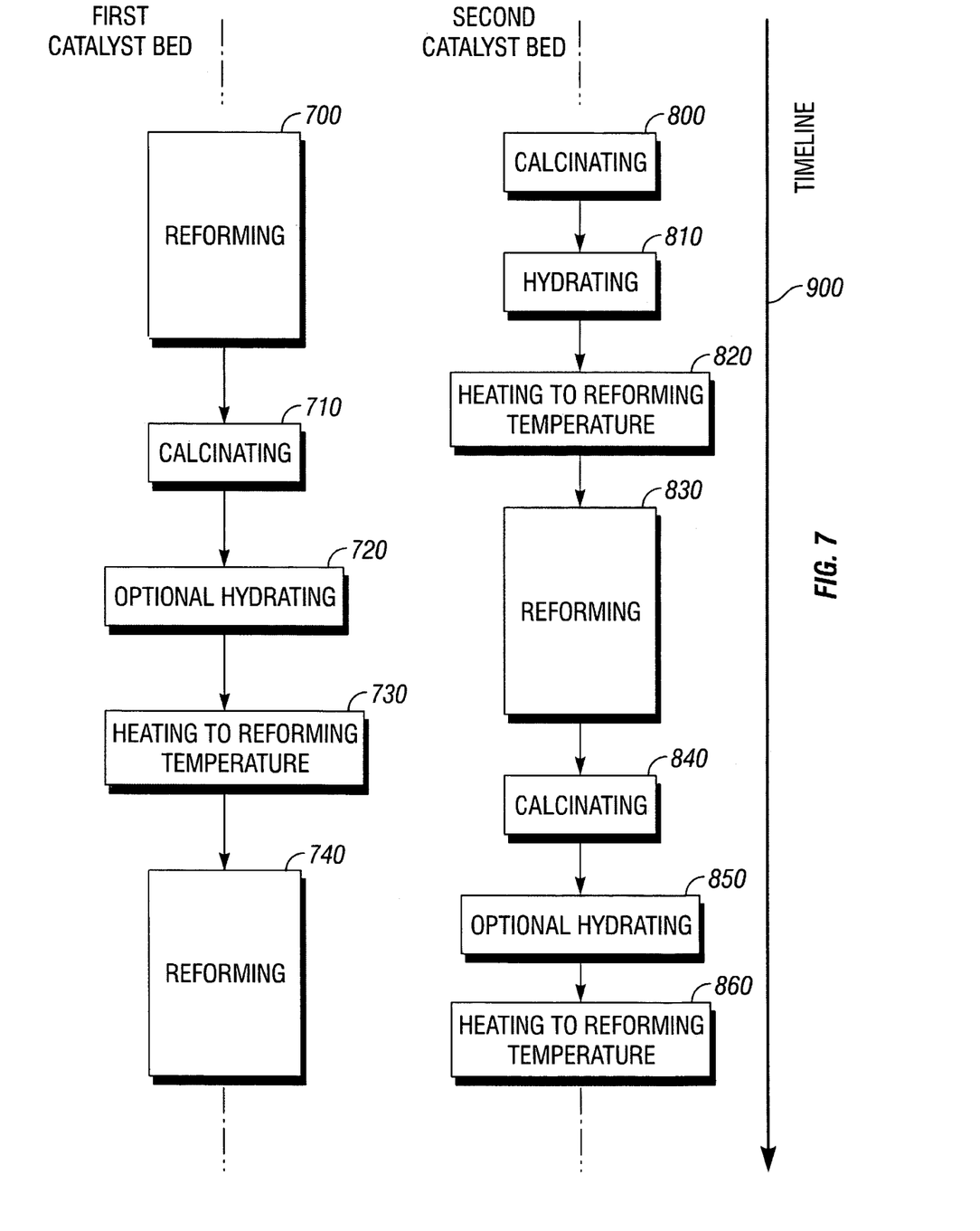
FIG. 7 is a flow diagram illustrating a method of the present invention.

In still yet another embodiment of the instant invention such as is illustrated generally in FIG. 7, a method is provided for continuously converting hydrocarbon fuel to a hydrogen-rich reformate by reforming hydrocarbon fuel in a first bed while calcinating carbon dioxide fixing material in a second bed. Specifically, the method includes reforming a hydrocarbon fuel (block 700) in a first catalyst bed at a reforming temperature to produce a hydrogen-rich reformate. The first catalyst bed includes a reforming catalyst and a carbon dioxide fixing material that fixes at least a portion of the carbon dioxide in the hydrogen-rich reformate. A carbon dioxide fixing material within a second catalyst bed is calcinated by heating the carbon dioxide fixing material to a calcination temperature above the reforming temperature to release fixed carbon dioxide (block 800). The second catalyst bed includes a reforming catalyst and carbon dioxide fixing material. The calcinated carbon dioxide fixing material in the second catalyst bed is hydrated with steam at a hydration temperature below the reforming temperature to produce a regenerated carbon dioxide fixing material (block 810). Continuous conversion of hydrocarbon fuel to a hydrogen-rich reformate is achieved by reforming the hydrocarbon fuel in the first catalyst bed while calcinating and hydrating the carbon dioxide fixing material in a second catalyst bed (block 810) as indicated by timeline 900.

Optionally, the method further includes reforming a hydrocarbon fuel in the second catalyst bed at a reforming temperature to produce a hydrogen-rich reformate with the regenerated carbon dioxide fixing material fixing at least a portion of the carbon dioxide in the hydrogen-rich reformate (block 830), while calcinating the carbon dioxide material in the first catalyst bed by heating the carbon dioxide fixing material to a calcination temperature above the reforming temperature (block 710). In some embodiments, the calcinated carbon dioxide fixing material in the first catalyst bed can be hydrated with steam to produce a regenerated carbon dioxide fixing material (block 720). Continuous conversion of hydrocarbon fuel to a hydrogen-rich reformate is achieved by reforming the hydrocarbon fuel in the second catalyst bed (block 830) while calcinating the carbon dioxide fixing material in the first catalyst bed (block 710).

In still yet another illustrative embodiment of the instant invention, a method is provided for generating hydrogen wherein a calcinated carbon dioxide fixing material is hydrated at a hydration temperature that is less than the reforming temperature used to convert the hydrocarbon fuel to hydrogen. Specifically, such a method includes reforming a hydrocarbon fuel at a reforming temperature in a catalyst bed comprising a reforming catalyst and a carbon dioxide fixing material to produce a reformate comprising hydrogen and carbon dioxide, the carbon dioxide fixing materials fixing at least a portion of the carbon dioxide in the reformate to produce a hydrogen-rich reformate and fixed carbon dioxide. The carbon dioxide fixing material within the catalyst bed is calcinated at a calcination temperature to release fixed carbon dioxide. The calcinated carbon dioxide fixing material is hydrated with steam at a hydration temperature that is below the reforming temperature, preferably below 600° C., more preferably below about 450° C. and still more preferably below about 300° C. The hydrocarbon fuel is preferably a gas at 30° C., and more preferably comprises methane.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method for generating hydrogen, the method comprising the steps of:
    reforming a hydrocarbon fuel in a first catalyst bed comprising a reforming catalyst and a carbon dioxide fixing material at a reforming temperature to produce a reformate comprising hydrogen and at least one impurity selected from the group consisting of carbon monoxide, carbon dioxide, and unreacted hydrocarbon fuel, the carbon dioxide fixing material fixing at least a portion of the carbon dioxide in the reformate to produce a hydrogen-rich reformate and fixed carbon dioxide;
    monitoring the amount of hydrogen or the least one impurity in the reformate;
    calcinating the carbon dioxide fixing material within the first catalyst bed at a calcination temperature to release the fixed carbon dioxide; and then
    hydrating the calcinated carbon dioxide fixing material with steam, said hydrating occurring when the monitored amount of hydrogen or the at least one impurity in the reformate is at a predetermined level.

2. The method of claim 1, wherein hydrogen is monitored and the predetermined level is less than about 97%.

3. The method of claim 2, wherein the predetermined level is less than about 95%.

4. The method of claim 3, wherein the predetermined level is less than about 92%.

5. The method of claim 1, wherein the at least one impurity is carbon dioxide and the predetermined level is greater than about 0.5%.

6. The method of claim 5, wherein the predetermined level is greater than about 1%.

7. The method of claim 6, wherein the predetermined level is greater than about 1.5%.

8. The method of claim 1, wherein the at least one impurity is carbon monoxide and the predetermined level is greater than about 5 ppm.

9. The method of claim 1, wherein the predetermined level is greater than about 15 pm.

10. The method of claim 1, wherein the predetermined level is greater than about 25 ppm.

11. The method of claim 1, wherein the at least one impurity is unreacted hydrocarbon fuel and the predetermined level is greater than about 0.75%.

12. The method of claim 11, wherein the predetermined level is greater than about 1%.

13. The method of claim 11, wherein the predetermined level is greater than about 1.5%.

14. The method of claim 1, further comprising the step of calcinating a carbon dioxide fixing material within a second catalyst bed at a calcination temperature to release fixed carbon dioxide while reforming the hydrocarbon fuel in the first catalyst bed.

15. A method for generating hydrogen, the method comprising the steps of:
performing two or more reforming/calcinating cycles, each reforming/calcinating cycle comprising (a) reforming a hydrocarbon fuel in a catalyst bed comprising a reforming catalyst and a carbon dioxide fixing material to produce a reformate comprising hydrogen and carbon dioxide, the carbon dioxide fixing material fixing at least a portion of the carbon dioxide in the reformate to produce a hydrogen-rich reformate and fixed carbon dioxide; and (b) calcinating the carbon dioxide fixing material within the catalyst bed to release fixed carbon dioxide; and
hydrating the calcinated carbon dioxide fixing material with steam after performing the two or more reforming/calcinating cycles.

16. The method of claim 15, further comprising the step of performing one or more reforming/calcinating cycles after hydrating the calcinated carbon dioxide fixing material.

17. The method of claim 15, further comprising the step of allowing the catalyst bed to cool to a shut down temperature after hydrating the calcinated carbon dioxide fixing material.

18. A method for generating hydrogen, the method comprising the steps of:
calcinating a carbon dioxide fixing material within a first catalyst bed at a calcination temperature to release fixed carbon dioxide, the first catalyst bed comprising the carbon dioxide fixing material and a reforming catalyst;
hydrating the calcinated carbon dioxide fixing material with steam at hydration temperature below a reforming temperature;
heating the first catalyst bed to the reforming temperature; and
performing one or more reforming/calcinating cycles after heating the catalyst bed to the steam reforming temperature, each reforming/calcinating cycle comprising (a) reforming a hydrocarbon fuel in the first catalyst bed to produce a reformate comprising hydrogen and carbon dioxide the carbon dioxide fixing material fixing at least a portion of the carbon dioxide in the reformate and (b) calcinating the carbon dioxide fixing material within the catalyst bed to release fixed carbon dioxide.

19. The method of claim 18, wherein the hydration temperature is below 600° C.

20. The method of claim 18, wherein the reforming temperature is between about 400° C. and about 800° C.

21. The method of claim 20, wherein the reforming temperature is between about 450° C. and about 700° C.

22. The method of claim 21, wherein the reforming temperature is between about 500° C. and about 650° C.

23. The method of claim 18, wherein the calcination temperature is above about 550° C.

24. The method of claim 23, wherein the calcination temperature is above about 650° C.

25. The method of claim 24, wherein the calcination temperature is above about 750° C.

26. A method for generating hydrogen, the method comprising the steps of:
calcinating a carbon dioxide fixing material within a first catalyst bed at a calcination temperature to release fixed carbon dioxide, the first catalyst bed comprising the carbon dioxide fixing material and a reforming catalyst;
hydrating the calcinated carbon dioxide fixing material with steam at hydration temperature below a reforming temperature;
heating the first catalyst bed to the reforming temperature; and
reforming a hydrocarbon fuel in a second catalyst bed comprising a reforming catalyst and a carbon dioxide fixing material to produce a reformate comprising hydrogen and carbon dioxide while calcinating the carbon dioxide fixing material in the first catalyst bed.

27. The method of claim 26, wherein the hydration temperature is below 600° C.

28. The method of claim 26, wherein the reforming temperature is between about 400° C. and about 800° C.

29. The method of claim 28, wherein the reforming temperature is between about 450° C. and about 700° C.

30. The method of claim 29, wherein the reforming temperature is between about 500° C. and about 650° C.

31. The method of claim 26, wherein the calcination temperature is above about 550° C.

32. The method of claim 31, wherein the calcination temperature is above about 650° C.

33. The method of claim 32, wherein the calcination temperature is above about 750° C.

34. A method for continuously converting hydrocarbon fuel to a hydrogen-rich reformate, the method comprising the steps of:
reforming a hydrocarbon fuel in a first catalyst bed comprising a reforming catalyst and carbon dioxide fixing material at a reforming temperature to produce a hydrogen-rich reformate, the carbon dioxide fixing material fixing at least a portion of the carbon dioxide in the hydrogen-rich reformate to produce a hydrogen-rich reformate and fixed carbon dioxide;
calcinating a carbon dioxide fixing material in a second catalyst bed comprising a reforming catalyst and carbon dioxide fixing material by heating the carbon dioxide fixing material to a calcination temperature above the reforming temperature; and
hydrating the calcinated carbon dioxide fixing material in the second catalyst bed with steam at a hydration temperature below the reforming temperature to produce a regenerated carbon dioxide fixing material;

wherein hydrocarbon fuel is reformed in the first catalyst bed while the carbon dioxide fixing material is hydrated in the second catalyst bed.

35. The method of claim 34, further comprising the steps of:
reforming a hydrocarbon fuel in the second catalyst bed at a reforming temperature to produce a hydrogen-rich reformate, the regenerated carbon dioxide fixing material fixing at least a portion of the carbon dioxide in the hydrogen-rich reformate; and calcinating the carbon dioxide material in the first catalyst bed by heating the carbon dioxide fixing material to a calcination temperature above the reforming temperature; wherein hydrocarbon fuel is reformed in the second catalyst bed while the carbon dioxide fixing material is calcinated in the first catalyst bed.

36. The method of claim 35, further comprising the step of hydrating the calcinated carbon dioxide fixing material in the first catalyst bed with steam to produce a regenerated carbon dioxide fixing material.

37. A method for generating hydrogen, the method comprising the steps of:
reforming a hydrocarbon fuel in a catalyst bed comprising a reforming catalyst and a carbon dioxide fixing material at a reforming temperature to produce a reformate comprising hydrogen and carbon dioxide, the carbon dioxide fixing material fixing at least a portion of the carbon dioxide to produce a hydrogen-rich reformate and fixed carbon dioxide;
calcinating the carbon dioxide fixing material within the catalyst bed at a calcination temperature to release fixed carbon dioxide; and
hydrating the calcinated carbon dioxide fixing material with steam at a hydration temperature below the reforming temperature.

38. The method of claim 37, wherein the hydration temperature is below 600° C.

39. The method of claim 37, wherein the hydration temperature is below about 450° C.

40. The method of claim 39, wherein the hydration temperature is below about 300° C.

41. The method of claim 37, wherein the hydrocarbon fuel is a gas at 30° C.

42. The method of claim 41, wherein the hydrocarbon fuel comprises a component selected from the group consisting of methane ethane, propane, butane, and mixtures thereof.

43. A method for generating hydrogen, the method comprising the steps of:
reforming a hydrocarbon fuel in a first catalyst bed comprising a reforming catalyst and a carbon dioxide fixing material at a reforming temperature to produce a reformate comprising hydrogen and at least one impurity selected from the group consisting of carbon monoxide, carbon dioxide, and unreacted hydrocarbon fuel, the carbon dioxide fixing material fixing at least a portion of the carbon dioxide in the reformate to produce a hydrogen-rich reformate and fixed carbon dioxide;
monitoring the amount of hydrogen or the least one impurity in the reformate;
calcinating the carbon dioxide fixing material within the first catalyst bed at a calcination temperature to release the fixed carbon dioxide; and then
hydrating the calcinated carbon dioxide fixing material with steam, said hydrating occurring when the monitored amount of hydrogen or the at least one impurity in the reformate is at a predetermined level by first dropping temperature of the first catalyst bed below 600° and then exposing the first catalyst bed to steam.

* * * * *